United States Patent [19]
Lea

[11] Patent Number: 5,983,373
[45] Date of Patent: Nov. 9, 1999

[54] FAIL-SAFE SYSTEM MONITORING AND SAFETY COMMUNICATION NETWORK

[75] Inventor: Richard W. Lea, Caldecott, United Kingdom

[73] Assignee: R.W.L. Consultants Limited, Leicestershire, United Kingdom

[21] Appl. No.: 08/788,364

[22] Filed: Jan. 24, 1997

[51] Int. Cl.[6] .................................................. G06F 11/00
[52] U.S. Cl. ............................................ 714/712; 324/74
[58] Field of Search ............................. 370/20.1; 324/74; 714/712

*Primary Examiner*—Phung M. Chung
*Attorney, Agent, or Firm*—Heslin & Rothenberg, P.C.

[57] ABSTRACT

In order to monitor the operation of a system or apparatus, a physical parameter of the system or apparatus is repeatedly changed or periodically oscillated within defined limits. Under normal conditions, stable oscillation will occur. In the event of a fault or system failure, oscillations will become unstable and a fault indicator may be generated. A communication system which may use the foregoing monitoring method includes a plurality of function units arranged in groups with individulal units in each group being connected to each other in series. A separate address is allocated to each group of function units and communication with units in each group is achieved sequentially.

5 Claims, 5 Drawing Sheets

FAIL-SAFE SYSTEM MONITORING AND SAFETY COMMUNICATION NETWORK

The present invention relates to the monitoring of safety apparatus and systems whose failure may result in a dangerous event. Thus, it is required that such apparatus and systems should "fail safe". The invention also relates to communication system including a number of individual safety elements or modules.

One simple example of the general type of safety apparatus to which the invention is applicable comprises a light enmitter and a photo-detector positioned on opposite sides of an elevator door, to halt closure if a person or object is blocking the door. More complex examples include so-called "light curtains" which provide a number of generally parallel light beams to form a complete screen.

Single beam and multi-beam devices are inclined to fail after prolonged use and are susceptible to environmental changes such as temperature. For example, wear or temperature change may cause a light emitter to emit lower intensity light which could be mistaken for a beam interruption.

The present invention provides a method of monitoring the operation of a system or apparatus comprising measuring a physical parameter of the system or apparatus and repeatedly changing the parameter within defined limits, the direction of change depending on the parameter measurement.

In contrast to currently available closed loop control systems, the parameter is varied at repeated intervals even if it is determined to be within the pre-set limits. This has particular advantages for fault finding, which will become evident.

In effect, the invention uses an "unstable equilibrium" condition in order to monitor operation. In its simplest form, the invention uses elements having gain and time delay to form an oscillator. Thus, under normal conditions, the parameter is varied up and down periodically. In other words the loop gain is below the threshold for oscillation.

The unstable equilibrium is achieved under closed loop conditions associated with the normal or safe state and equilibrium is lost under abnormal or fault conditions.

The method described above can be further improved by additionally monitoring the number of parameter increments and decrements, Under normal operation a number of increments (possibly as few as one) will take the parameter to near the upper of the pre-set limits and will be followed by a number of decrements. Thus, too many consecutive increments or too many consecutive decrements ray be indicative if a fault. Therefore, it is preferable in the method according to the invention to provide a fault indication in response to a number of consecutive increments or consecutive decrements which is greater than a predetermined limit.

In addition, a fault indication or other signal is usually provided if the parameter is determined to be outside the pre-set limits. For example, very low intensity light may be indicative of a beam interruption in which case it may be necessary to switch off a machine or halt the closure of an elevator door.

Considering now the specific case of light curtains or security guards including a number of beams, currently available devices are subject to a number of limitations. These devices usually comprise a transmitting head having a number light transmitters arranged in a predetermined array and a receiving head including a number of receivers arranged in an array corresponding to the transmitter array. These devices typically use narrow beams of the electromagnetic energy, usually light or infra-red, and therefore the transmitting head and the receiving head have to be accurately aligned. The control method described above avoids the need for the beams to be narrowly focused. Instead of the transmitting and receiving heads being aligned with fine accuracy, the beam intensity can be varied to compensate for any misalignment. (It should be noted that the beams must not be so wide as to introduce cross-talk between adjacent receivers.)

The light sensors or receivers provide separate outputs such that if one beam is interrupted, appropriate action is taken.

Another aspect of the invention provides a method of monitoring the operation of a system or apparatus comprising measuring a physical parameter of the system or apparatus and repeatedly changing the parameter within defined limits, the direction of change depending on the determined measurement. The function units in each group may be configured as a shift register. The function units can be monitored in the manner described above.

The various aspects of the invention are intended to be applied in any situation where failure of the system to a specific output state (e g. a shut-off signal) is required to avoid a hazard or latent hazard. Applications include detecting persons, mechanical position monitoring and process parameter monitoring. The term "physical parameter" is intended to cover all of the foregoing.

The monitoring method of the invention may be adapted for specific applications. Linearity of response is not necessary and indeed is not used in the specific example described below.

The simplest implementation of the control loop requires, at minimum, elements having gain and time delay to form an oscillator. To provide state monitoring a means of reducing the loop gain below the threshold for oscillation is required.

To adapt the invention for specific applications further refinements may be introduced linearity is not a requirement.

The two state "cause", two state "effect" example represents the simplest form of the feedback loop. In this form minimum gain and maximum time delay are the boundary conditions for operation. Where more sophisticated monitoring of the "safe" state and/or faults is required, further requirements may be added so that the gain/frequency characteristics of the loop are measured to any required level of accuracy. By these means any disturbances to the intended "safe" behaviour may be detected. Systems may be designed for example to tolerate slow changes in gain, whilst rapid increases or decreases are detected as unsafe.

Increased numbers of states for the "cause" or "effect" parameters and defined cause/effect timings are the simplest method of increasing sophistication.

The component parts of the feedback loop may operate in the analogue domain, or a combination of the two. The loop may operate continuously or intermittently.

The implementation of the communication system may employ any medium suitable for the application examples include, electrical signals, optical signals, sonic signals, radio signal type electromagnetic radiation.

When monitoring function modules according to the invention, the feedback loops are preferably adapted for use with the serial communication system, such that completion of the loop (either forward path or feedback path) depends upon signals within the serial communication system. Because continuous operation of all the loops is not possible in a multi-point bussed system, the loops are arranged to operate intermittently. Intermittent operation in itself provide the required time delay in the loop.

The protocol of the serial communication may be of any type, it is only necessary that "cause" and "effect" signals for each loop are identifiable to allow confirmation that the "safe" state is being maintained.

Another aspect of the invention provides a communication system including a plurality of function units each requiring interrogation, wherein the function units are arranged in groups with individual units in each group being connected to each other in series and each group having a single connection to a data bus, and a control unit for controlling the operation of the function units.

Each function unit may comprise a source of a physical parameter and means for measuring the parameter, alternatively viewed as "cause" and "effect" elements. The sources or cause elements may be arranged to form a shift register and the quantifying means or "effect" elements may be configured as a corresponding shift register.

In the preferred embodiment of the invention, means are provided for addressing the first position in each shift register, for shifting the position addressed through the register and for detecting that the last position in the register is, or was previously, addressed. However, when cross coupling between function units is possible, fault detection integrity can be maintained if address shifting is dependent upon an operation of a function unit (e.g. output state change or output signal sent) as opposed to selection. Similarly address shifting may be designed to occur only following the output of an "effect" message. By these means, automatic address shifting can be achieved within a section of a scanned array of loops, with minimum overhead. Faults occurring within such a section causing incorrect addressing are detected by a disturbance in the expected pattern of signals. Most significantly the signals associated with last position in register are affected, irrespective of the position of the fault within the section. This ensures that such faults are detected contemporaneously with the state monitoring of the section to prevent states being monitored as "safe" when an addressing fault is present.

The combination of inventions described above is appropriate for situations where operation (e.g. of machine) is permitted when all points are in the "safe" condition and inhibited in any other condition. For more sophisticated applications (e.g. aero engine monitoring) multiple redundant systems may be employed, but the basic property of failsafe operation still applies, so that system faults always cause the monitoring to give a predictable result.

The monitoring of two mutually exclusive states (e.g. valve open/same valve shut) will enable monitoring system faults to be differentiated from faults on the equipment being monitored.

Another aspect of the present invention provides a safety guard comprising a transmitting unit having a plurality of energy transmitters arranged in a predetermined array, a receiving unit comprising a number of energy receivers arranged to receive energy from the energy transmitters and a separate control unit for controlling the operation of the transmitting unit and the receiving unit, the transmitting unit, the receiving unit and the control unit being connected to each other via a data bus.

Having separated the control unit from the transmitting unit and the receiving unit, the same control unit may be used to control another safety guard and thus it is possible to provide a complete safety network. Different safety guards on the same network will have allocated to them different addresses which are identifiable by the control unit. Preferably each safety device has one address per energy beam and the control unit may simply "see" the separate safety guards as one safety guard having a large number of energy beams.

An embodiment of the invention will now be described by way of example only and with reference to the accompanying drawings in which.

Figure 1:
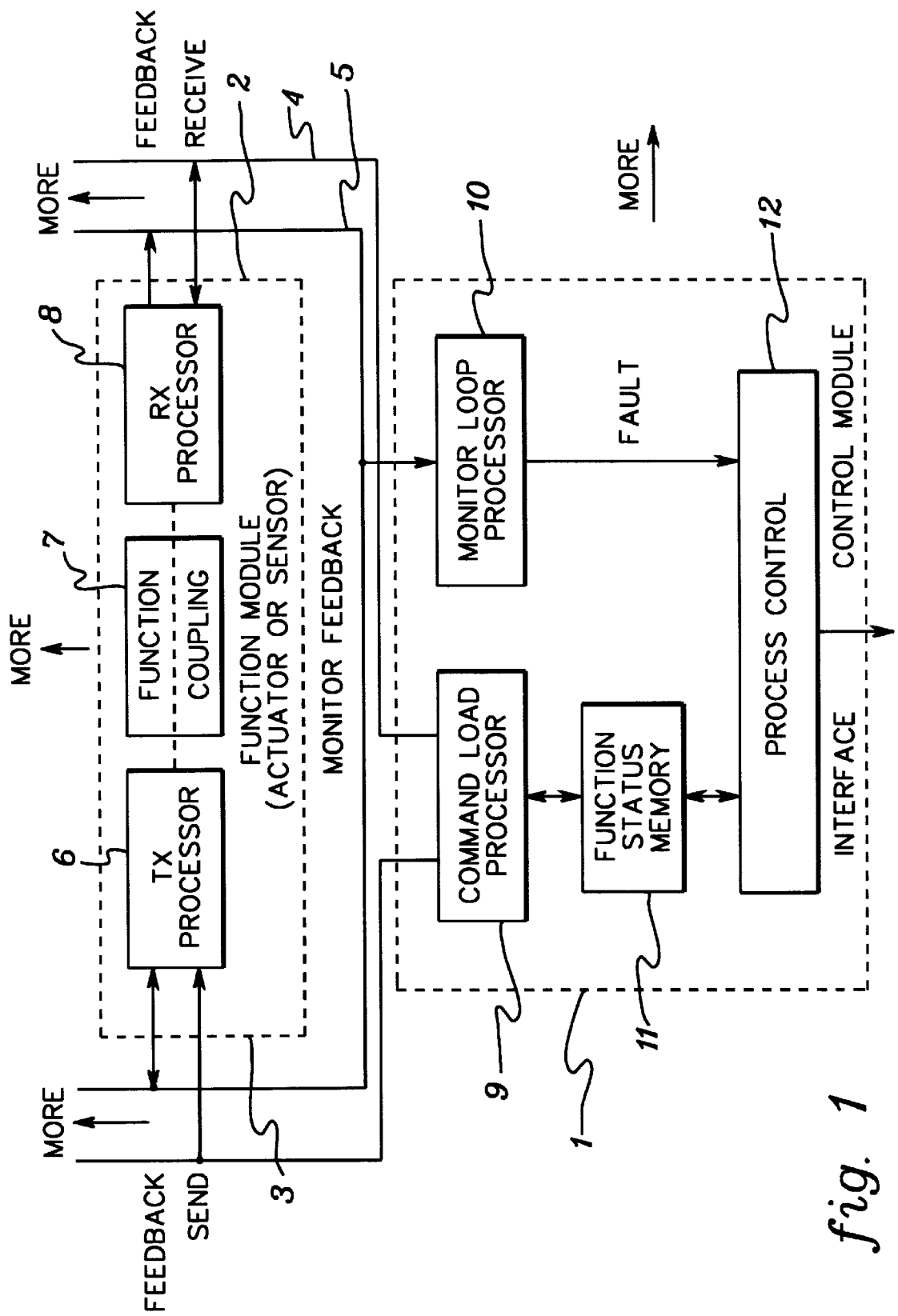
FIG. 1 is a schematic diagram showing the basic components of a system in which the method of the invention may be implemented.

The system illustrated in FIG. 1 includes a control module 1 and a function module 2.

The system may be expanded to include several control modules and several function modules. Signals are sent from the control module to the function module via the SEND bus 3 and are received from the function module at the control module via RECEIVE bus 4. The purpose of the SEND bus is to select a function module and send a command to it from the command loop processor which is part of the control module. The purpose of the RECEIVE bus is to convey to the command loop processor signals representing the status of the function module 2. The SEND bus 2 and the RECEIVE bus 4 together constitute a command loop. A separate feedback loop 5 is indicated. The purpose of the feedback loop 5 is to convey signals from one part of the function module back to another part of the function module to be described in more detail below. Signals from the feedback loop 5 are also fed back to the control module 1.

The buses are shown as separate entities for the purpose of illustration but it will be appreciated that signals on all buses could be carried on a single data bus.

The function module comprises a transmitter (TX) processor 6, a function 7 examples of which will be given below and a receiver (RX) processor 8. The TX processor processes various commands from the buses and outputs commands to the function 7. The function 7 is one which operates according to a physical parameter capable of incremental modification by the TX processor 6. The RX processor 8 receives input signals from the function 7, digitises them if necessary, and outputs information to the feedback loop.

The control module 1 comprises a command loop processor 9, monitor loop processor 10, function status memory 11 and process control 12. The command loop processor generates the control signals to interrogate all function modules under its supervision based on the status of the function status memory. The command loop processor also translates command loop received data into a status map in the function status memory. The monitor loop processor monitors the analogue loop for proper operation and issues a fault indication if any function module goes to an "open loop" condition, The function status memory 11 is a dual ported RAM which contains a map of command status and feedback status signals. The processor control 12 provides the evaluation and command function for the dual ported RAM. It is the communication link between the safety related system and functions outside the system.

A system according to the invention may include a number of function modules arranged singly (single channel) or in groups (multiple channel) up to the capacity of the system designed. The control modules may be arranged singly or in multiples with one being the master and the others being slaves to the master.

A particular example of a function which could be incorporated in the system described above is one channel of a safety guard or light curtain. The light curtain has been chosen as a specific example because it illustrates several preferred features of the present invention. The system of the present invention lends itself to multiple curtains connected together on the same data network or mixed devices such as interlocks or stop switches together with light curtains.

Figure 2:
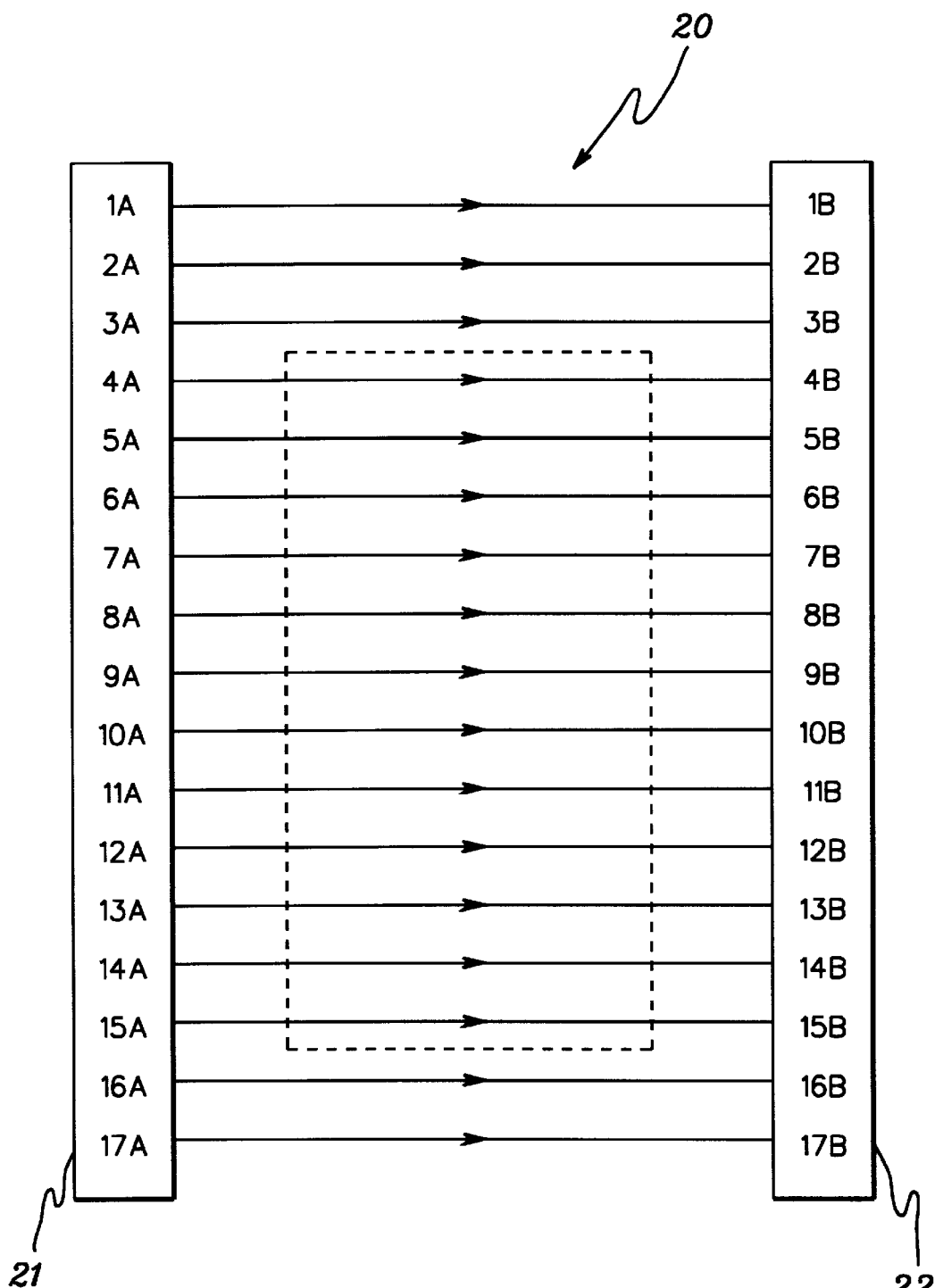
FIG. 2 is a schematic diagram of a safety guard of the type which may be used in the present invention.
Figure 3A:
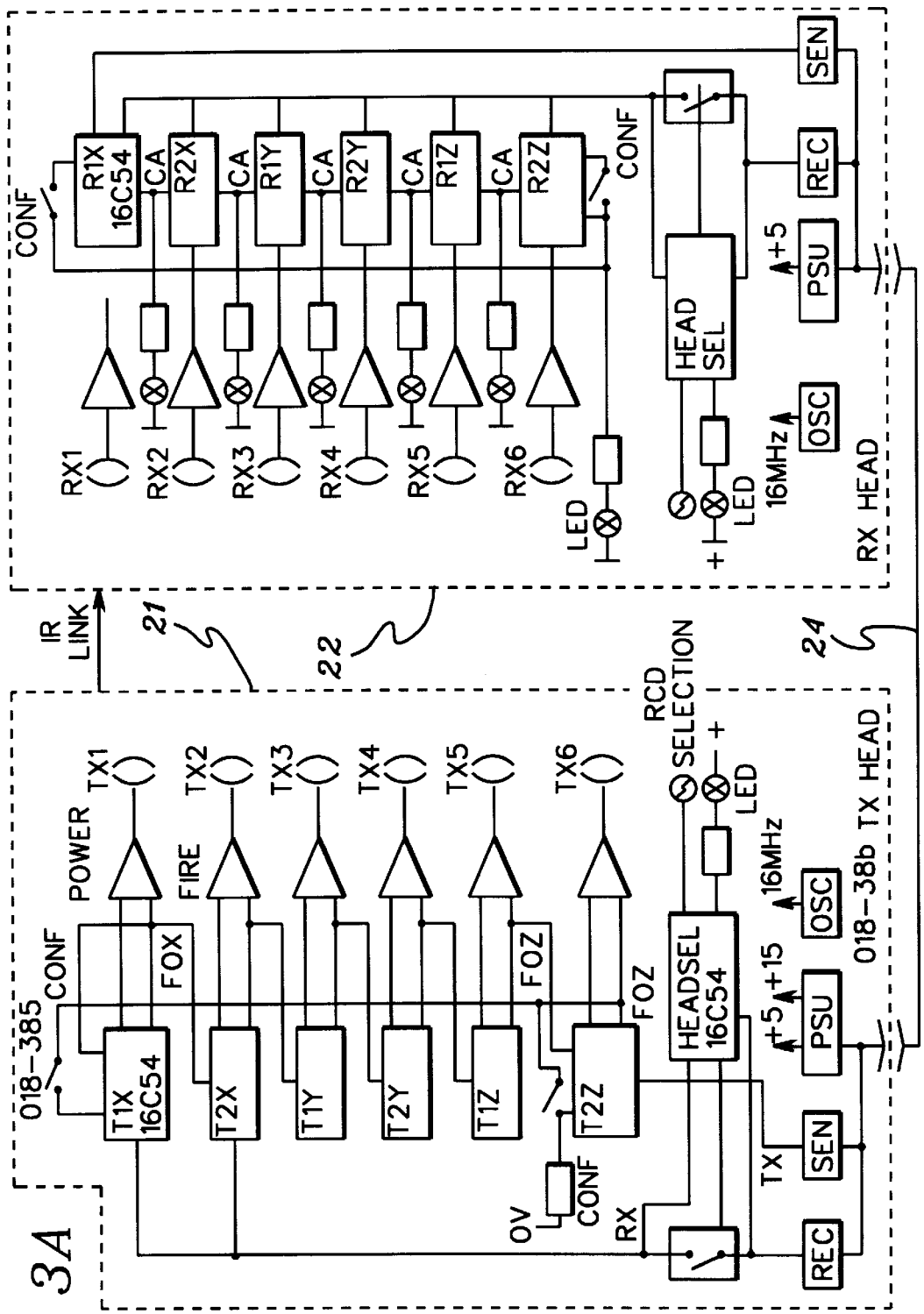
FIG. 3A illustrates the components of the receiving head and the transmitting head in more detail.
Figure 3B:
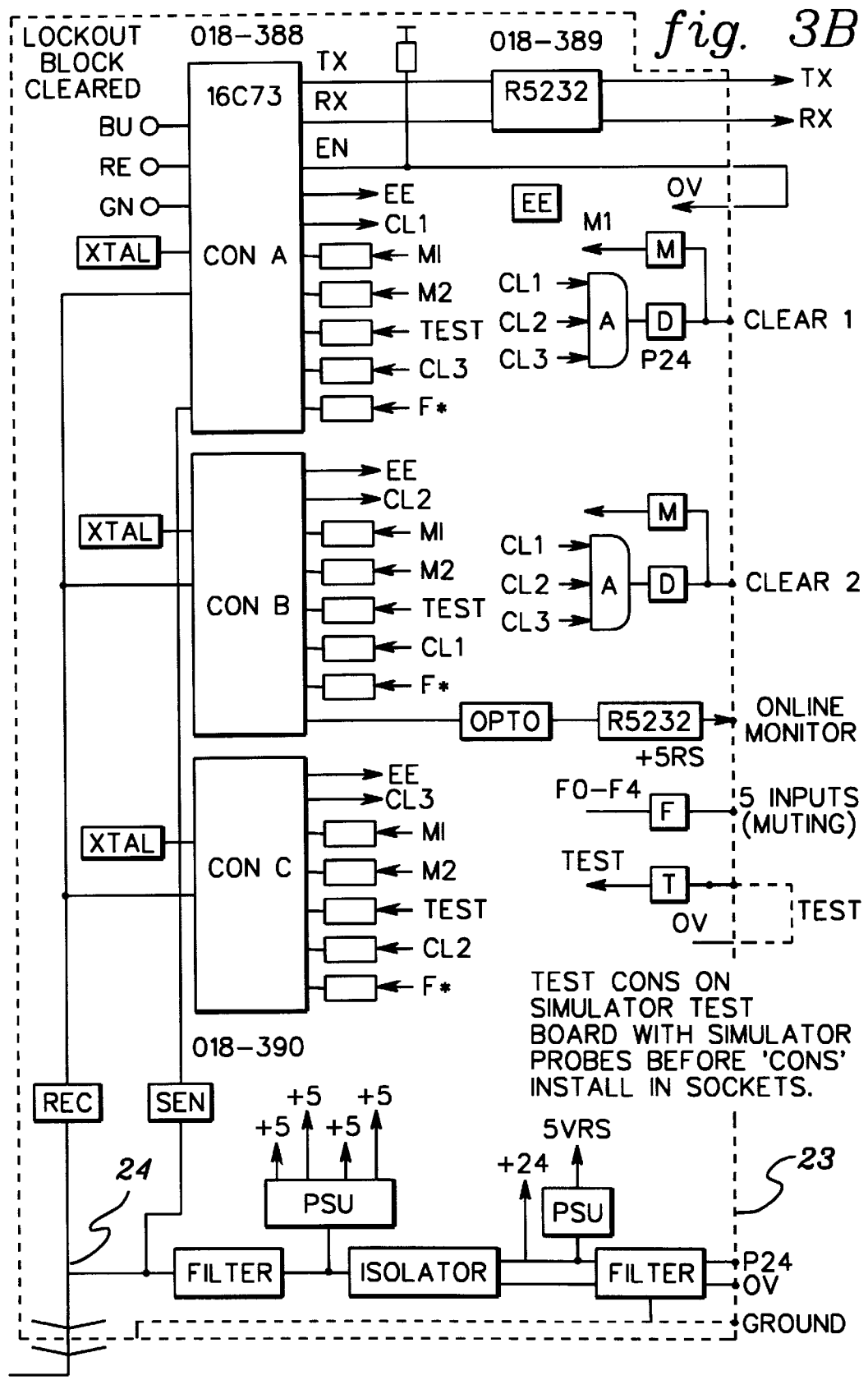
FIG. 3B illustrates the components of the control unit.

FIG. 2 illustrates schematically a safety guard, otherwise known as a light curtain, of the type which may be used in the present invention, generally indicated by reference numeral 20. The guard comprises a transmitting head 21 and a receiving head 22. The receiving head includes a row of transmitters 1A–17A which each emit a beam of energy, typically infra-red, to one of a corresponding row of receivers 1B–17B. The beams are emitted in parallel to span a plane between the transmitter head 21 and the receiving head 22. The guard may be used to protect an item of machinery indicated in dotted lines. The guard operates such that if one of the beams is interrupted, for example by the hand of a machinery operator, the machine is switched off to avoid injury to the operator. Light curtains are used in a variety of other hazardous applications including chemical and nuclear processes and other applications where safety critical events take place.

Rather than operating continuously, the transmitters 1A–17A typically emit pulses of energy periodically. The foregoing is true of currently available safety guards as well as a safety guard used in the present invention.

Each transmitter/receiver pair, e.g. 1A/1B, comprises one "channel" of the safety guard and may comprise one function coupling 7 in FIG. 1.

In order to avoid the need to accurately align the transmitting head 21 and the receiving head 22, the transmitters 1A–17A emit relatively wide beams of energy and their intensity is controlled by a continuously operating closed loop system. Each of the receivers 1B–17B has associated circuitry for comparing the intensity of the received energy with pre-set levels and providing one of four signals in response to each pulse of energy from a transmitter, namely:

BAD HIGH (BH)
OK HIGH (OH)
OK LOW (OL)
BAD LOW (BL)

Each of the signals represents an intensity band, the signals OK HIGH and OK LOW defining a "pass band" which is preferably at the middle of the operating range of the receivers. In response to the intensity signals the safety system provides the following commands.

| SIGNAL | COMMAND |
| --- | --- |
| BAD HIGH | SWITCH OFF MACHINE |
| OK HIGH | REDUCE INTENSITY (RED) |
| OK LOW | INCREASE INTENSITY (INC) |
| BAD LOW | SWITCH OFF MACHINE |

Under normal operating conditions, with no faults and no operator interference, the beam intensity from each transmitter is increased or reduced after every pulse between OK HIGH and OK LOW. If the intensity departs from the pass band due to a fault in the system or an interruption of the beam, a SWITCH OFF signal is generated. In addition, if, despite continuously increasing or reducing beam intensity, an OK HIGH signal or an OK LOW signal is generated several times (the exact number to be defined, preferably three,) consecutively, this indicates a system fault and a SWITCH OFF signal is generated.

By controlling the intensity of the transmitters in this way, and continuously altering their intensity, no fault go undetected, and no beam interruption goes undetected. The continuous variation of beam intensity will ensure that problems caused by component ageing, variations in manufacturing tolerances, component parameter variations, temperature changes, differences between beams at "power on" and slow variations overtime, are compensated. Also, as will become clear from the following, the guard can readily be incorporated in a data network.

Light curtain standards require that the system should have a specified immunity to the effect of reflective surfaces placed near a beam (thus providing an alternative path for the beam to travel) the design path is therefore bypassed and a dangerous event could occur. This eventuality is minimised usually by making very narrow dispersion angles for the beams (typically 3°). By doing this the curtains become very difficult to align. In this invention the analogue feedback loop adjusts the power until it is set with a ±50% passband. This allows a projected dispersion angle of 7° while still meeting the standard. Note that each individual beam is so set. The same feature, while assisting the user to install the system also allows lower cost optical components to be used in manufacture.

The foregoing can be regarded as a two state "cause" two state "effect" example of a feedback loop.

The circuitry associated with the receivers which controls the operation of the transmitters is incorporated in a separate control unit, not shown in FIG. 1.

FIG. 2A shows in more detail the circuitry in the transmitting head 21 and the receiving head 22 and FIG. 2B shows the circuitry in the control unit, designated 23.

The head 21, head 22 and control unit 23 comprise 3 modules which may form part of a larger security system to be described in more detail below. The modules 21,22,23 are connected to each other by a thin ethernet cable 24 carrying 24 V power and data communication signals. The cable 24 may interconnect other modules forming part of the overall system.

The beads 21 and 22 in FIG. 2A include six transmitters TX1 to TX6 and six receivers RX1 to RX6 respectively. It will be appreciated that a safety guard could include any number of transmitters and receivers depending on the particular application.

The transmitters TX1 and TX6 are controlled by microprocessors designated T1X,T2X, T1Y, T2Y, T1Z, T2Z. Each of T1X to T7 is equivalent to one TX processor in FIG. 1. In this particular arrangement, three transmitters are controlled by one processor T1 and the other three by a second transmitter T2. Signals from the microprocessors are supplied to the transmitters via amplifiers. In normal operation the control unit 23 supplies to the transmitter 21 alternate "fire" and "shift" signals whereby the transmitters TX1 to TX6 are fired in turn, and additional signals for increasing (INC) or decreasing (DEC) the intensity of the beam from each transmitter according to signals received from the receivers RX1 to RX6. The intensity of the transmitters is adjusted after each firing.

Signals from the receivers RX1 to RX6 in the receiving bead 22 are each amplified and supplied to two microprocessors. R1X, R1Y and R1Z represent one microprocessor receiving signals from receivers RX1, RX2 and RX3 respectively. R2X, R2Y, R2Z represent a further microprocessor receiving signals from receivers R4,R5,R6.

Each of R1X to R2Z is equivalent to one RX processor in FIG. 1.

The control unit 23 illustrated in FIG. 2B receives signals from the transmitting head 21 and the receiving head 22 and sends signals back to the heads 21, 22 to control their operation. The controller also has the capacity to control other receive and transmit heads connected to the same cable 24. This is made possible by removing the control circuitry for the receive and transmit heads 21,22 to a separate control unit, The control unit performs all of the functions of the control module 1 of FIG. 1 for each receiver/transmitter pair.

In addition to the signals referred to above, the control unit 23 also receives timing signals, referred to also as "carry" signals from the transmit and receive heads 21,22, for fault indication, to be described in more detail below.

The control unit 23 includes three identical microcontrollers, CONA, CONB and CONC. CONA is for primary control of the transmit and receive heads 21,22 and CONB and CONC have a monitoring function. CONA, CONB and CONC all receive the same signals and operate in the same way, but only CONA sends out control signals. CONB and CONC provide an extra level of safety in that if their outputs do not agree with CONA, or fault indication may be generated, resulting in machine shut-off for example.

The bus 24 must be a very high speed data transfer system to meet the response time requirements for fail-safe system. Rather than running with a conventional protocol, the system has been designed to meet the speed requirements by design rather than a high band rate. A high reliability is achieved using simple non-custom hardware. The bus uses a 4-bit protocol with a possible 16 message options as shown below.

|   | | BITS | | | |
|---|---|---|---|---|---|
|   | S | 0 | 1 | 2 | 3 | MESSAGE |
| 0 | X | | | | | BAD LOW |
| 1 | X | X | | | | OK LOW |
| 2 | X | | X | | | BAD HIGH |
| 3 | X | X | X | | | OK HIGH |
| 4 | X | | | X | | BAD LOW + CARRY BIT (2) |
| 5 | X | X | | X | | OK LOW + CARRY BIT (2) |
| 6 | X | | X | X | | BAD HIGH + CARRY BIT (2) |
| 7 | X | X | X | X | | OK HIGH + CARRY BIT (2) |
| 8 | X | | | | X | FIRE |
| 9 | X | X | | | X | CHARGE |
| A | X | | X | | X | SHIFT CHARGE |
| B | X | X | X | | X | SPARE |
| C | X | | | X | X | SPARE |
| D | X | X | | X | X | HEAD SELECT + DATA |
| E | X | | X | X | X | SET UP + DATA |
| F | X | X | X | X | X | SPARE |

(S = Start Bit)

Thus messages 0–7 are for receiver head control and 8 to F are for transmitter head control. A "HEAD SELECT" signal is followed by a head identification number (0–16). A SET Up signal follows a HEAD SELECT signal and is followed by data for setting beams via head at their initial conditions, including pre-setting intensity levels and beam powers.

The following is an owner/user chart for the sixteen possible message options:

|  | | | OWNERS (O) | USERS (U) | |
|---|---|---|---|---|---|
| SIGNAL | TX | RX | CONA | CONB | CONC |
| 0 | | O | U | U | U |
| 1 | | O | UO | U | U |
| 2 | | O | U | U | U |
| 3 | | O | UO | U | U |
| 4 | | O | U | U | U |
| 5 | | O | U | U | U |
| 6 | O | O | U | U | U |
| 7 | | O | U | U | U |
| 8 | U | | O | U | U |
| 9 | U | | O | U | U |
| A | U | | O | U | U |
| B | | | | | |
| C | | | | | |
| D | U | | O | U | U |
| E | U | | O | U | U |
| F | | | | | |

Thus, for example, messages 0 to 7 all originate in a receiving head RX.

The method of operation of the bus has the following special features:

(1) Individual transmitters in a head are addressed in sequence as in a shift register so that specific addresses are required only when moving from one head to another.

(2) Selection and transmission are controlled by three signals (charge, fire and shift) originating from the control processor.

(3) There are four response signals possible, one of which is sent as a reply. These signals contain data for the control loop as well as the feedback loop.

(4) Two other signals initialise the system by sending precept messages to the transmitter head.

It is anticipated that interrogation and power adjustment of each module (i.e. transmitter/receiver pair) will be complete within 78 microseconds.

A carry bit (bit 2 set) is generated by the last receiver in a head as an indication that all transmitters and receivers have operated in one "scan". This is an additional safety feature. The control module generates a fault indication if no carry bit is received at the expected time, which may be due to an error within an individual head.

Figure 4:
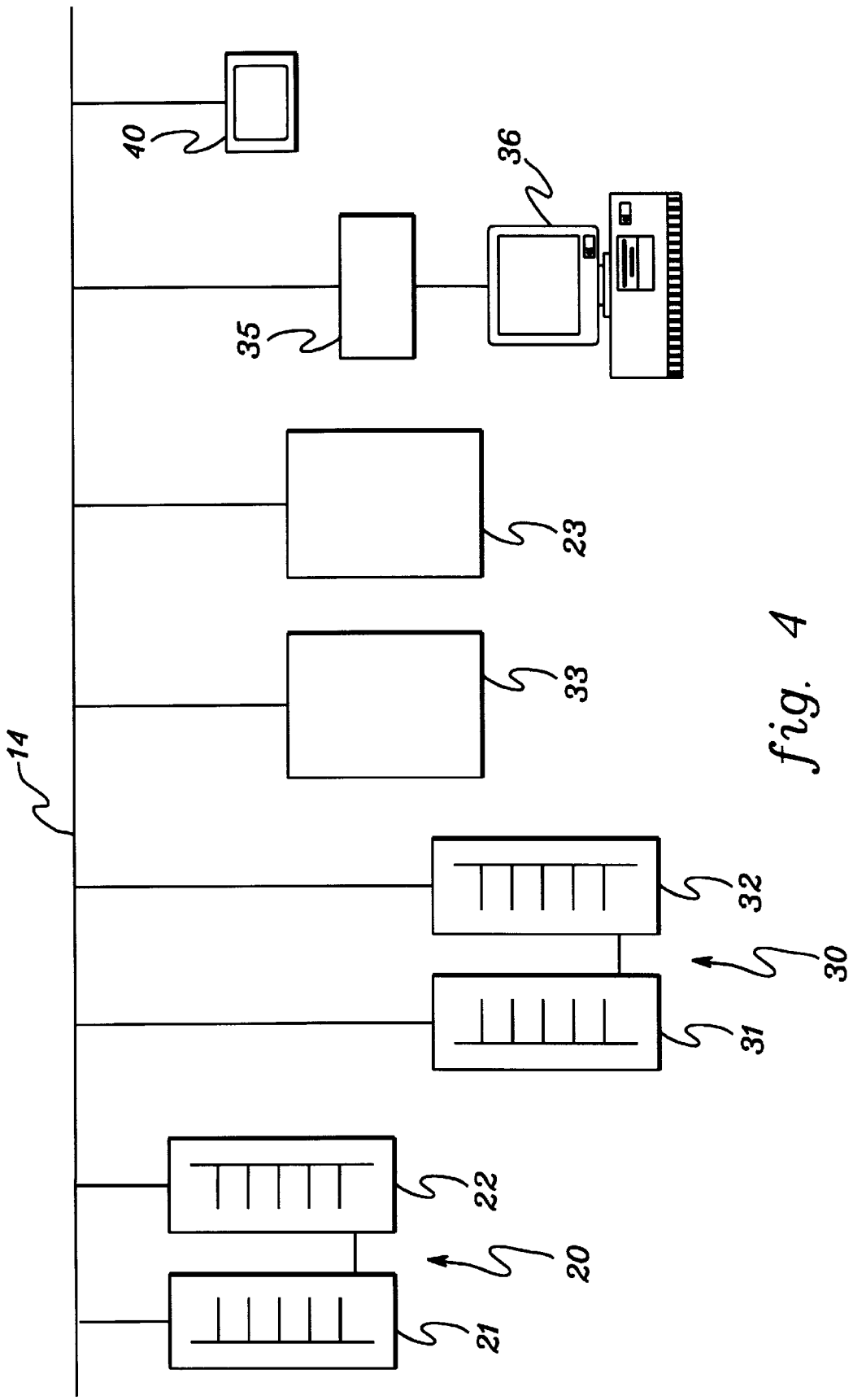
FIG. 4 is a block diagram of a safety network according to the invention.

FIG. 4 shows a complete safety system according to the invention. The transmit and receive units 21,22 of the first safety guard 20 connected to a control unit 23 via ethernet cable 24. A second safety guard 30 comprising transmit head 31 and receive head 32 is also connected to the control unit 23. The safety guards 20,30 and any other safety guards forming part of the system collectively form the system sensor function.

The safety guards have allocated to them different addresses to enable them to be identified by the controller. In a typical example up to 128 addresses will be available, and each guard will occupy a number of addresses, corresponding to the number of transmitters.

The control unit 23 supervises the data bus 24 and controls the operation of the safety guards according to their standard mode of operation. An extended control unit 33 enhances control unit 23 to control the operation of the safety guards and other parts of the system sensor function according to the specific operation. For example, in a particular application, part of one safety guard might be disabled, or one safety guard might be required to operate more quickly than another. Whilst the control unit 23 controls all safety equipment to the same level of integrity extended control unit 23 allows variations.

A P.C. interface 35 is connected between data bus 24 and a computer 36 to enable the programming of the components of the system to be altered, for example, when re-configuring a system for a new application.

A visual display 40 is provided for overall system supervision and provides a visual indication for example, when one safety guard operates and causes a machine shut-off.

It should be noted that in the present invention it is not necessary for the individual processors to have any self monitoring capability. A large number of processors is used in a neural network and each can be treated as a "black box" with only the effect of errors on the input/output lines considered. The processors are networked in such a way that if a fault occurs, an adjacent processor or the network will be caused to shift the error to a central point in the network where error detection takes place.

I claim:

1. A method of monitoring the operation of an apparatus comprising the steps of;
   a) generating a physical parameter of the apparatus;
   b) repeatedly changing the parameter within predetermined limits;
   c) measuring the parameter;
   d) generating a difference in the value of the parameter, either incremented or decremented depending on the previous parameter measurement;
   e) monitoring the number of parameter increments and decrements;
   f) generating a fault indication if a number of consecutive increments or consecutive decrements is greater than a predetermined number; and
   g) generating a fault indication if the measured parameter is outside the predetermined limits.

2. The method according to claim 1 in which the parameter is determined to be in one of a number of predetermined ranges and the amount of change is a fixed amount.

3. The method of claim 1, wherein the apparatus comprises a light curtain including at least one beam, the light curtain comprising: a transmitting head having at least one light transmitter arranged in a predetermined array; a receiving head including a corresponding number of receivers arranged in an array corresponding to the transmitter array; and means to cause transmitted beam intensity to be varied repeatedly within predetermined limits, the direction of change depending on the received beam intensity; wherein the physical parameter comprises a first intensity of the at least one beam; and wherein the different parameter comprises a second intensity of the at least one beam.

4. The method of claim 1, wherein the apparatus comprises a safety guard, the safety guard comprising: a transmitting unit having a plurality of energy transmitters arranged in a predetermined array; a receiving unit comprising a corresponding number of energy receivers arranged to receive energy from the energy transmitters; a separate control unit for controlling the operation of the transmitting unit and the receiving unit; and a data bus connecting together the transmitting unit, the receiving unit and the control unit; and wherein the physical parameter and the different parameter comprise a first physical parameter and a second physical parameter of the energy.

5. The method of claim 1, wherein the apparatus comprises a communication system including: a plurality of function units, each function unit requiring regular interrogation; wherein the function units are arranged with individual units in each group being connected one to another in series and each group having a single connection to a data bus; and control unit means for controlling the operation of the function units; wherein at least some of the function units comprise a source of the physical parameter and the different parameter, and means for measuring same.

* * * * *